UNITED STATES PATENT OFFICE.

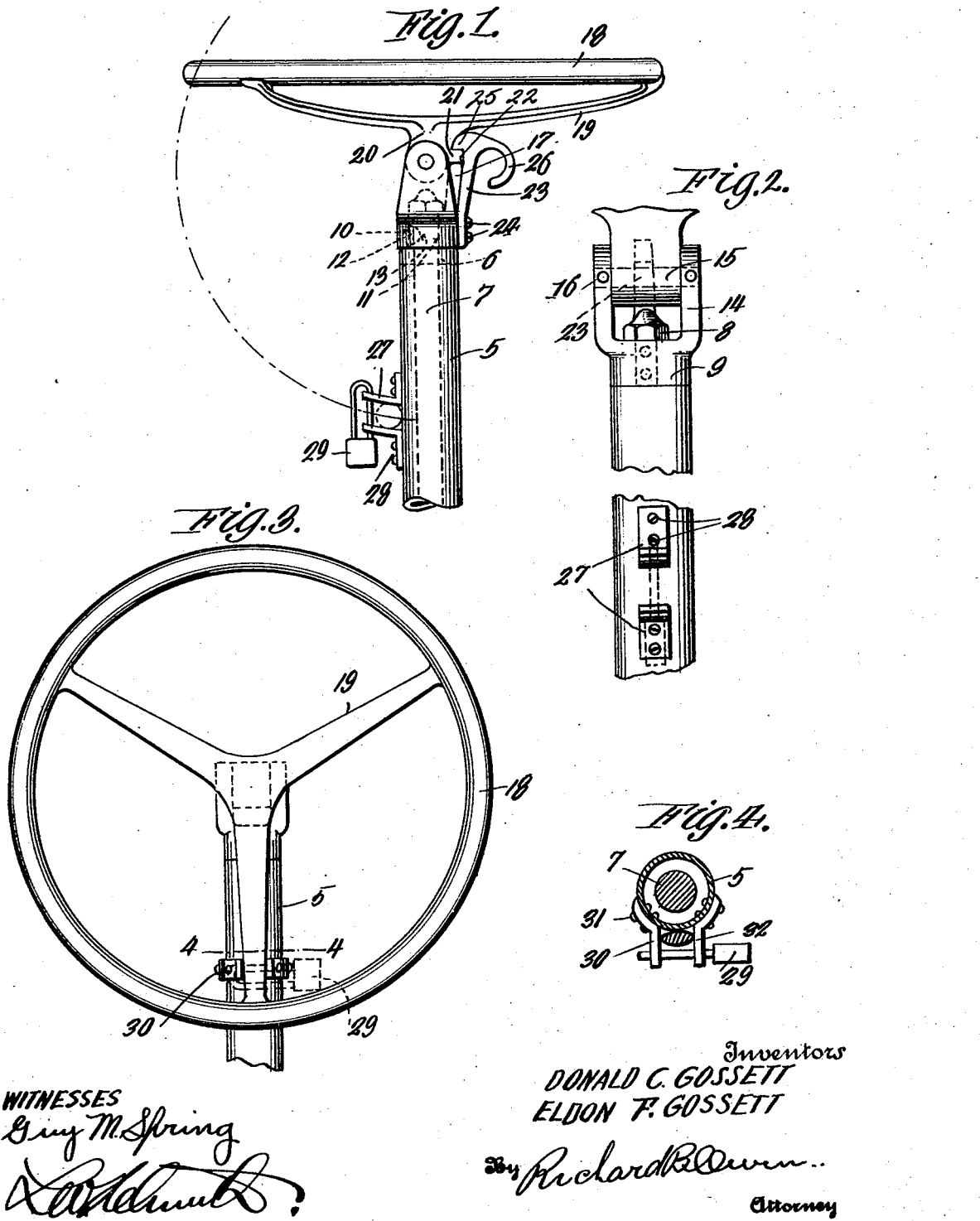

DONALD C. GOSSETT AND ELDON F. GOSSETT, OF DETROIT, MICHIGAN.

STEERING WHEEL AND LOCK THEREFOR.

1,414,405.   Specification of Letters Patent.   Patented May 2, 1922.

Application filed May 9, 1919. Serial No. 295,911.

*To all whom it may concern:*

Be it known that we, DONALD C. GOSSETT and ELDON F. GOSSETT, citizens of the United States, residing at Detroit, in the county of Wayne, and State of Michigan, have invented certain new and useful Improvements in Steering Wheels and Locks Therefor, of which the following is a specification.

Our invention relates to new and useful improvements in steering wheels and more particularly to that type in which the steering wheel is pivotally connected to the steering post, and an important object of the invention resides in the provision for means for locking the steering wheel in either an operative or inoperative position.

Another object of our invention resides in the provision of means carried by the steering post for engaging the steering wheel to securely retain said wheel in an operative position.

Another object of our invention resides in the provision of means carried by the steering post for engagement with either a wheel rim or the spider thereof for securely locking the wheel in an inoperative position.

A still further object of the invention resides in the provision of a novel post cap which is secured to the steering rod and to which is also pivotally connected the spider of a steering wheel, said post cap being further provided with means for securely retaining the steering wheel in an operative position.

Other objects and advantages of the invention will become apparent during the course of the following description.

In the accompanying drawings forming a part of the description and wherein like numerals are employed to designate like parts through the same, Fig. 1 is a side elevation of our invention.

Fig. 2 is a front elevation of the same.

Fig. 3 is a front elevation of the invention illustrating the steering wheel locked to the steering post or in an inoperative position, and Fig. 4 is a transverse section taken on the line 4—4 of Fig. 3.

In the drawings wherein is shown for the purpose of illustration a preferred embodiment of our invention, the numeral 5 designates a hollow steering post, in the upper end of which is mounted a bushing 6, which serves as a bearing for the steering rod 7. This steering rod extends up through the steering post, through the bushing 6 to extend a substantial distance above the top of the steering post. The free end of the steering rod is screw threaded to receive a nut 8, which nut engages a portion of a post cap 9, and retains the post cap upon the steering post. In order that the post cap 9 may rotate the steering rod, we provide a longitudinally extending groove 10 in the periphery of the longitudinal opening 11 through the post cap. A Woodruff key 12 is arranged partially within the groove 10, while the curved or semi-circular portion of the key is received in a slot 13 in the steering rod.

The post cap 9 is provided with a pair of vertically arranged spaced arms 14, and as more clearly shown in Fig. 2 of the drawing, the nut 8 being positioned therebetween. Adjacent the free end of each arm 14 we provide an opening, which openings align to receive a pin 15 rigidly secured to the arms by means of headless set screws 16. An upstanding lug 17 is formed upon the post cap between the arms thereof, and the free end of this lug is arranged in close proximity to the plane of the pin 15.

A steering wheel 18 is provided with a spider 19, which in turn is provided with a depending portion 20 having an opening therethrough for the reception of the pin 15, whereby a steering wheel is pivotally connected to the post cap 9 between the vertically extending arms 14 thereof. The depending portion 20 of the spider is provided on its rear edge with an outwardly extending lug 21, the outer face of which is curved as at 22 for a purpose which will presently appear. As clearly shown in Fig. 1, when the steering wheel is in an operative position the bottom of the lug 21 rests upon the top of the cap lug 17 and in order to retain these two lugs in engagement with each other, we provide a resilient catch 23, the lower end of which is secured to the post cap by button head screws 24 or by any other suitable means. The forward portion of the upper end of the resilient catch is provided with a forwardly extending shoulder 25, which shoulder engages the top of the lug 21 and retains said lug in close engagement with the cap lug 17. The rear part of the upper portion of the catch is provided with a finger grip 26 by which the operator may actuate the resilient catch at will.

In the form of invention disclosed by Figures 1 and 2 in connection with the means for locking the steering wheel in an inoperative position and against the steering post, the spider 19 consists of three legs, two of which are arranged adjacent the forward side of the steering wheel. In this case, the rim of the steering wheel is received between a pair of L-shaped locking plates 27, which are secured to the steering post 5, after the steering wheel has been swung upon its pivot pin 15 and the rim thereof engages the steering post. These plates 27 have one arm thereof secured to the steering post by means of rivets 28 or the like, in such a manner that the free arms of the plates are arranged in the same vertical plane and extend outwardly of the steering post in substantially a horizontal plane. However, as will be clearly noted in Fig. 1 the free arms of the angle plates 27 incline slightly upwardly so as to efficiently receive the rim of the steering wheel at the proper time. In each free arm adjacent its end, we provide a perforation, which perforations are aligned to receive the shackle of a pad lock 29, or any other desirable locking means.

When it is desired to lock the steering wheel, the operator grasps the resilient catch 23 by its grip 26 and moves the same toward the seat of the auto to such an extent that the shoulder 25 of the catch disengages the lug 21 carried by the depending portion 20 of the spider 19. This operation will of course free the steering wheel so that it may be moved forwardly through an arc of a circle until the rim of the steering wheel engages the steering post 5 and is arranged between the free arms of the angle plates 27. When the steering wheel attains this position, the shackle of an ordinary pad lock is passed through the aligned perforations in the free arms of the angle plates 27 to retain the rim of the steering wheel between these arms.

In the modified form of invention disclosed in Figures 3 and 4, the arms of the spider 19 are arranged in such a manner that only one of the legs of the spider is arranged adjacent the forward portion of the wheel, while the other two legs of the spider are arranged adjacent the rear portion of the wheel. In this instance, instead of the rim of the steering wheel being engaged to retain the wheel in a locked position, the forward leg of the spider 19 is engaged, as clearly shown in Fig. 3. When this type of wheel is employed the angle plates 30, as clearly shown in Fig. 4, have one arm of each secured to the steering post by means of rivets 31 or the like in such a manner that the free arms 32 of the angle plates are both arranged in the same horizontal plane. As in the form enclosed in Figures 1 and 2, the free arms 32 are spaced apart and their free ends are provided with aligned perforations for the reception of the shackle of a pad lock 29 as set forth above. Therefore, when the steering wheel is swung in an arc of a circle until its rim engages the post 5, it will be seen as in Fig. 3 that the forward leg of the spider 19 will be arranged between the free arms 32 of the angle plates 30. The pad lock 29 is then of course applied to the free arms 32 in a manner to prevent the leg of the spider 19 from becoming disengaged from therebetween.

After the pad lock 29 has been removed and it is desired to place the steering wheel in an operative position, the steering wheel is swung rearwardly in an arc of a circle until the lug 21 contacts with the forward face of the shoulder 25 of the resilient catch 23. By reason of the lug 21 being provided with the curved face 22 the lug will readily force the resilient catch 23 rearwardly, sufficiently for the nose of the lug 21 to pass the nose of the lug 25 and so that the lug 21 will become seated upon the upper face of the cap lug 17. When the lug 21 attains this position, the resilient catch will immediately spring forward to engage the upper face of this lug to securely retain the steering wheel in an operative position.

The foregoing description and the drawings have reference to what may be considered the preferred, or approved, form of invention. It is to be understood that we may make such changes in construction and arrangement and combination of parts, materials, dimensions, etc., as may prove expedient and fall within the scope of the appended claims.

Having thus fully described our invention, what we claim as new and desire to secure by Leters Patent, is:

1. The combination with a steering post and a steering wheel pivoted thereto, of a pair of spaced arms secured to the post to receive therebetween a portion of said wheel, and means for connecting the free ends of the arms to prevent said portion of the wheel from becoming disengaged from between said arms.

2. The combination with a steering post and a steering wheel pivoted thereto, of a pair of spaced parallel arms secured to the post to receive therebetween a portion of said wheel, and means for connecting the free ends of the arms to lock said portion of the wheel between the arms.

3. The combination with a steering post and a steering wheel pivoted thereto, of a pair of spaced apertured arms secured to the post to receive therebetween a portion of said wheel, and a padlock having its shackle extended through the apertured arms to lock therebetween said portion of the steering wheel.

In testimony whereof we affix our signatures in presence of two witnesses.

DONALD C. GOSSETT.
ELDON F. GOSSETT.

Witnesses:
ALOYS F. ALBERS,
WM. H. YOUNG.